United States Patent [19]
Pastureau et al.

[11] Patent Number: 5,882,765
[45] Date of Patent: Mar. 16, 1999

[54] ELEMENT MADE OF A REINFORCED LOW DENSITY HEAT PROTECTIVE MATERIAL AND METHOD TO OBTAIN SAID ELEMENT

[75] Inventors: Nicole Pastureau, Eysines; Michel Daniel Hee, Avensan; David Francois Christian Cussac, La Teste; Jean-Claude Richard, Bordeaux, all of France

[73] Assignee: Aerospatiale Societe Nationale Industrielle, Paris Cedex, France

[21] Appl. No.: 734,699

[22] Filed: Oct. 21, 1996

[30] Foreign Application Priority Data

Oct. 20, 1995 [FR] France .................................. 95 12597

[51] Int. Cl.⁶ ..................................................... B32B 3/06
[52] U.S. Cl. ................. 428/102; 244/117 R; 244/117 A; 244/121; 244/158 A; 428/105; 428/117; 428/119; 428/120
[58] Field of Search ..................................... 428/102, 105, 428/117, 120, 119, 265, 268, 280; 244/158 A, 121, 117 A, 117 R

[56] References Cited

U.S. PATENT DOCUMENTS

| | | | |
|---|---|---|---|
| 3,349,814 | 10/1967 | Webb | 141/5 |
| 3,532,588 | 10/1970 | Newman | 428/221 |
| 3,603,260 | 9/1971 | Johnson | 244/158 A |
| 3,951,718 | 4/1976 | Gonzalez | 156/79 |
| 4,215,161 | 7/1980 | Siebold | 427/228 |
| 4,655,866 | 4/1987 | Ferrier | 156/192 |

FOREIGN PATENT DOCUMENTS

| | | |
|---|---|---|
| 0 189 720 | 8/1986 | European Pat. Off. . |
| 0 273 291 | 7/1988 | European Pat. Off. . |
| 2 268 102 | 11/1975 | France . |
| 2 538 507 | 6/1984 | France . |
| 2 625 793 | 7/1989 | France . |
| 2 191 115 | 12/1987 | United Kingdom . |

*Primary Examiner*—Nasser Ahmad
*Attorney, Agent, or Firm*—Young & Thompson

[57] ABSTRACT

An element made of a reinforced low density heat protective material including an elastomer and/or a silicon resin matrix loaded with organic and/or inorganic components, wherein the reinforcement is formed of glass or ceramic thread sections or the like or organic materials fitted in the mass of the matrix along directions approximately orthogonal to at least one of the faces of the element and being flush, at least at one of their extremities, with at least one of the faces. The method for obtaining this element, includes, after molding to the general dimensions and shapes of the element with the aid of a loaded silicon matrix, placing the thread sections by stitching.

7 Claims, 2 Drawing Sheets

ELEMENT MADE OF A REINFORCED LOW DENSITY HEAT PROTECTIVE MATERIAL AND METHOD TO OBTAIN SAID ELEMENT

FIELD OF THE INVENTION

The present invention concerns a low density ablative material for heat protecting portions of space vehicles when they return into the earth's atmosphere.

BACKGROUND OF THE INVENTION

When returning into the atmosphere, a vehicle, such as a probe, capsule inhabited vehicle, etc., needs to confront the intense heat flows and consequently the most exposed portions need to be heat-protected.

To combat the heat flows, thermic insulating materials, known as ablative materials, are used to coat the structures to be protected and whose gradual destruction under the action of the heat flow impelled by a re-entry into the atmosphere protects the coated structure from the heat by means of various mechanisms summed up as follows:

- storage of energy resulting in a rise of the internal temperature of the ablative material;
- endothermic reaction, namely : depolymerization, fusion, sublimation, vaporization;
- energy loss via radiation;
- flow of gaseous substances opposing the heat flow.

This protection via the destruction of the thermic insulant is one of the most effective means available to combat the intense heat flows produced by an atmospheric return.

This type of material, known for a large number of years, is formed of an elastomer and/or a silicon resin. There is a RTV (Room Temperature Vulcanization) type elastomer loaded with organic components (carbonated compounds, cork) or inorganic (SiC, silica, aluminium).

This material is used as such and placed in the form of panels or mounted elements, especially glued elements, onto the surface to be protected.

So as to prevent a possible flowing of the ablative material under the heat flow, the constitutive matrix of the material, composed, for example, of a RTV elastomer, silica ecospheres and phenolic microballoons and/or other loads, is inserted in a honeycomb type structure.

Thus, it is possible to embody light, flat and mechanically resistant coating panels offering heat protection and good refractory properties.

Furthermore, by using honeycomb structures being flexible in various directions; it is possible to embody bent structures.

This technique consists of preparing the honeycomb structure, for example by indenting the walls of the cells so that the structure can be bent, followed by lining the cells of a siliconed matrix with a suitable formulation, of compacting the matrix and then shaping the entire unit in a press.

However, the flexibility of this honeycomb structure has limits concerning the degree of bending of the panels able to be made according to this technique which moreover poses the problem of filling which needs to be thorough without having any vacuum in the cells of the honeycomb structure.

Finally, the reinforcement constituted by this structure needs to be homogeneous concerning the entire weight of the final panel which does not make it possible to differentially reinforce the panel according to its various portions. For example, as it concerns a leading edge panel, it is not possible to significantly reinforce the most exposed portions of the panel, the reinforcement technique, as described earlier, proceeding by all or nothing.

SUMMARY OF THE INVENTION

The present invention offers a new technique for reinforcing low density ablative materials making it possible to obtain complex shapes and accentuated curves and the deliberate local modulation of the reinforcement on the shaped element.

To this effect, the invention concerns an element made of a reinforced low density ablative heat protective material including an elastomer and/or silicon resin matrix loaded with organic and/or inorganic components, wherein the reinforcement is formed of glass or ceramic thread sections or the like or of organic materials disposed in the mass of said matrix along directions approximately orthogonal to at least one of the faces of the element and being flush, at least at one of their extremities, with at least one of said faces, said fibers in one particular embodiment being impregnated with a polymerized phenolic resin.

The thread sections are preferably distributed regularly in zigzag fashion.

If appropriate, the element may comprise zones, such as those most stressed by the heat flow, and having a number of thread sections per surface unit exceeding the number of the other less stressed zones.

The invention also concerns a method for obtaining these elements, wherein, after molding to the general dimensions and shapes of said element with the aid of a loaded silicon matrix, said thread sections are placed by stitching.

So as to preserve the face of the element directly struck by the needle of the stitching machine, said face is preferably coated with a fabric or silica or glass felt or even organic materials.

According to one variant for implementing the method, threads are used pre-impregnated with a suitable phenolic resin, and after stitching, this resin is polymerized.

According to another variant, non-impregnated threads are used, and after stitching, the element is impregnated with a suitable phenolic resin and said resin is polymerized.

After polymerization of the phenolic resin, the faces of the element, possibly provided with said fabric or felt on one of its faces, are leveled so as to eliminate the projecting thread portions.

BRIEF DESCRIPTION OF THE DRAWINGS

Other characteristics and advantages shall appear more readily from the following description of embodiments of the material of the invention, said description being given solely by way of example and with reference to the accompanying drawings on which.

DETAILED DESCRIPTION OF THE PREFERRED EMBODIMENTS

Figure 1:
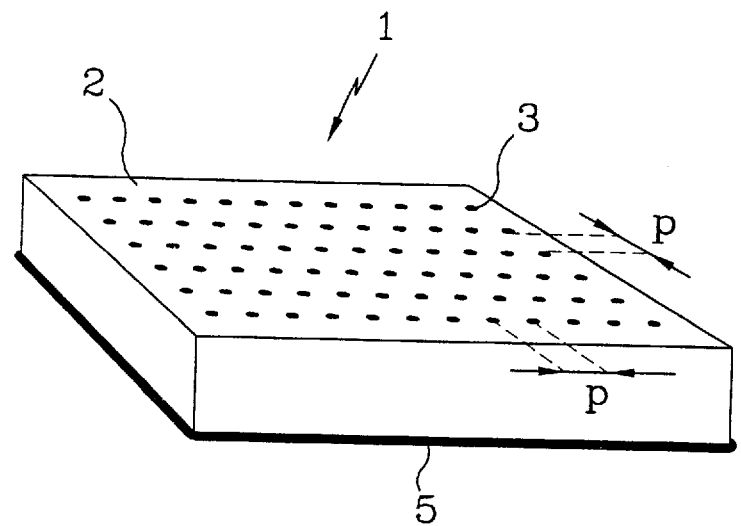
FIG. 1 is a perspective diagrammatic view of a sample element made of the material of the invention.

FIG. 1 shows at 1 a parallelpiped block formed of a reinforced low density ablative material in accordance with the invention and including a silicon elastomer matrix 2 and loads of various natures, especially silica ecospheres and phenolic resin microballoons whose role are to reduce the density of the material and, by virtue of their heat properties, reduce heat conductivity and thus block the radiative heat in the material, and finally contribute by the reactions established inside the material during ablation in enriching the carbonated residual layer on the surface of the ablative element, that is of providing this layer with good structural strength and good refractory properties.

A large number of formulations have been put forward for these matrix, possibly including additives for increasing the mechanical and refractory properties of the ablative material. The present invention does not target a particular type of formulation, but mainly concerns the reinforcement of these matrix, regardless to their composition.

As can be seen on FIG. 1, the element 1 includes rigid picots 3 distributed regularly in the mass of the matrix. The picots 3 are rectilinear sections of ceramic, glass or organic threads disposed orthogonal to the upper flat face of the element 1. They extend into the entire thickness of the element and are thus flush with the two opposing faces.

The grid for distributing the picots 3 is to the square pitch P of several millimeters, such as ten.

According to a preferred placing embodiment of the present invention of this reinforcement, the picots 3 are inserted in the matrix 2 by stitching with the aid of a suitable thread.

For example, it is possible to use ceramic/glass fibers known under the trade-mark 312 or 440 NEXTEL (sold by the 3M Company), KEVLAR thread type organic fibers (sold by the DUPONT DE NEMOURS Company).

The stiffening of the thread sections of picots 3 is after stitching ensured via the polymerization of a suitable impregnation resin.

As a suitable phenolic resin, it is possible to use resins from the family of resols or those from the family of novolaks, but also epoxy resins stitching is carried out with a suitable machine.

Figure 2:
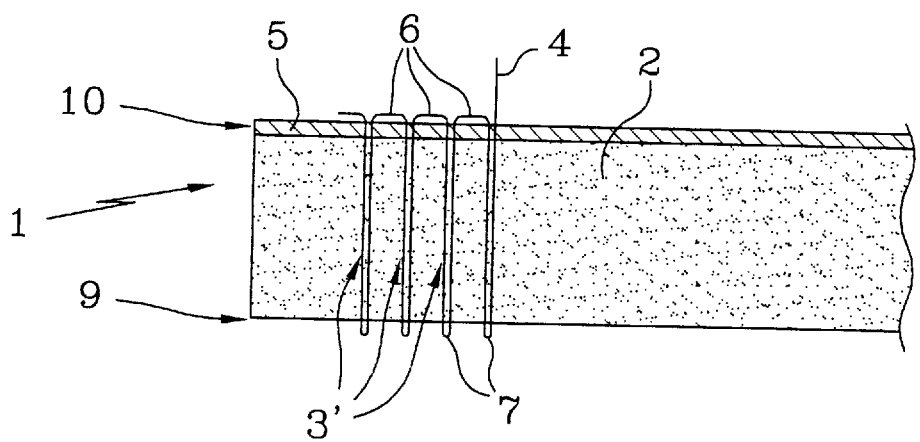
FIG. 2 is a diagram illustrating a mode for placing reinforcements in an element of the type of FIG. 1.

FIG. 2 shows a diagram of a mode for stitching an element 1 of the type of FIG. 1.

The needle (not shown on FIG. 2) appears on one of the faces of the element 1 (the upper face on FIG. 2) perpendicularly and traverses the element on both sides by moving the thread 4 which thus on each to-and-fro movement of the needle through the element 1 makes a to-and-fro movement 3' which shall subsequently constitute a picot 3.

Disposed on the upper face of the element 1 is a fabric or piece of felt formed of glass fibers so as to protect the matrix whose portions or particles could be pulled up by the needle coming out of the element. This fabric or felt moreover avoids incrusting in the material of the element 2 of the thread 4 portions 6 for linking between two consecutive stitchings following the traction exerted on the thread by the needle driven into the element.

The needle opens on the lower face of the element 1 and forms a loop on each stitching.

Once the stitching operations have ended, the element 1 is impregnated with the appropriate resin, is polymerized and finally is machined. To this effect, the lower face of the element 1 of FIG. 2 is made flush at 9 so as to remove the loops 7 and also at 10 so as to remove the thread sections 6 on the surface of the fabric or felt 5. This fabric or felt 5 is represented under the same numerical reference on FIG. 1 at the lower face of the element.

The method of the present invention has the advantage that the reinforcement of the matrix is carried out after molding of the matrix to the shapes and dimensions of the element to be obtained and that this reinforcement can be adapted, that is accentuated in the most stressed zones of the element.

Figure 3:
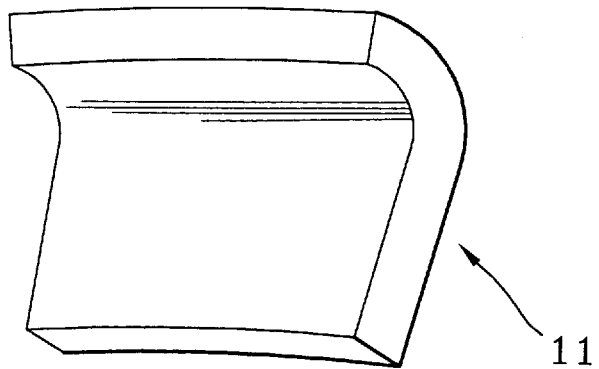
FIG. 3 is a perspective view of a panel shaped according to the invention and intended to be used for the heat protection of a leading edge of a space vehicle, for example.

By way of example, FIG. 3 illustrates a panel 11 intended to constitute a leading edge element and embodied via the molding of a matrix formed of a RTV 141 type silicon elastomer loaded with silica ecospheres and phenolic microballoons.

The method for producing this panel formed of this material is well known and is accordingly not described in detail.

Figure 4:
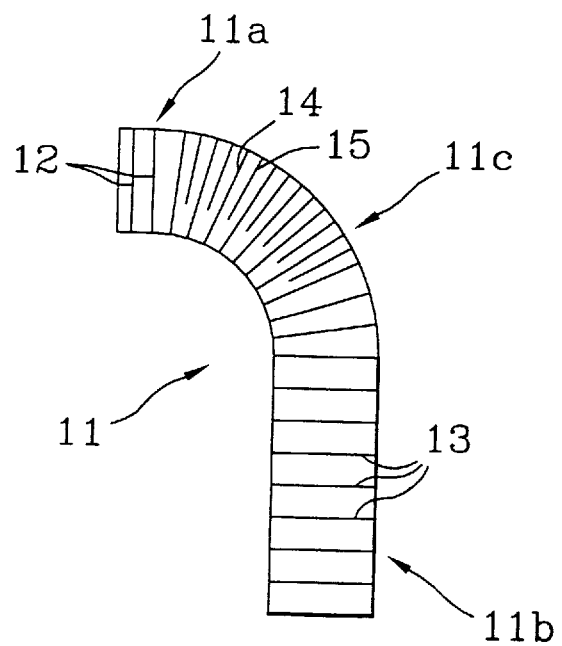
FIG. 4 is a section of the element of FIG. 3 illustrating a mode for installing the reinforcements.

FIG. 4 is a section of the panel of FIG. 3 illustrating a mode for implanting reinforcement elements constituted by picots similar to those of FIG. 1.

After the element 11 has been removed from the mold, said element is stitched normally on the surface with the aid of a suitable thread of the type mentioned above and a stitching machine whose needle shall be available to penetrate into the matrix of the element on either of its opposing faces, depending on the type of reinforcement to be inserted.

So as to embody the picots 12 or 13 being flush with the two opposing faces of the element 11, the needle shall attack the face affording the easiest access, the element to this effect being placed in a holding and positioning cradle.

If desired, the method of the invention makes it possible to densify a particular more exposed zone of the element, such as the portion 11a, by implanting picots 12 with a pitch smaller than that of the picots 13 of a portion 11b confronting the heat flows under the lowest incidences.

In the most curved portions 11c of the element, it is possible to insert picots 14 by means of stitching traversing the element on both sides and insert picots 15 in the gap between two adjacent picots, these latter picots being flush with the convex face of the element but not opening onto the concave face so as to keep an approximately constant gap between the threads in all directions. The penetration depth of these picots 15 can of course be adjusted.

The picots 12 to 15 can advantageously be distributed regularly in each zone and in zigzag fashion, the picots having a density per surface unit which varies from one zone to another.

The face attacked by the needle can firstly be coated with a fabric or felt 5.

The stiffening of the picots 12 to 15 can be obtained in two ways.

The thread used for stitching is pre-impregnated with a suitable resin, such as a phenolic resin. After the threads have been placed, the resin of the threads is polymerized and then the element is machined to the dimensions of the final element, as shown on FIG. 2 (making level of the faces of the element).

According to a second method, the thread used is not pre-impregnated and after stitching, the element undergoes an impregnation operation with the aid of a suitable resin and this operation is followed by a polymerization of the resin and this element is finally machined as indicated above.

Owing to the fact that the reinforcement is embodied after molding of the element, it is possible to give the latter a complex shape with large localized curves. It shall always be possible to gain access to one of the faces of the element so as to insert there threads perpendicularly or almost perpendicularly, possibly over the entire thickness of the element, and with any distribution pattern.

Finally, the invention is not merely limited to the embodiment examples described above, but on the contrary covers all possible variants as regard the nature of the loaded silicon matrix, the nature of the threads stitched or introduced in another way into the mass of the matrix, the thread distribution pattern, the nature of the thread impregnation resin, the ways and means for placing and polymerizing this resin, as well as the shapes, dimensions and intended location of the elements able to be made of this reinforced ablative material.

What is claimed is:

1. In an element having a plurality of opposite faces, and made of a reinforced low density ablative heat protective material including an elastomer and/or silicon resin matrix loaded with organic and/or inorganic components, the improvement wherein the reinforcement is formed of rectilinear sections of ceramic, glass or organic threads disposed in said matrix along directions approximately orthogonal to at least one of the opposite faces of the element, each thread section extending between two opposite faces and being flush at each of their extremities with one of said opposite faces, said thread sections being impregnated with an impregnation resin.

2. The element according to claim 1, wherein said thread sections are impregnated with a phenolic resin and polymerized.

3. The element according to claim 1, wherein said thread sections are impregnated with an epoxy resin and polymerized.

4. The element according to claim 1, wherein said thread sections are evenly distributed.

5. The element according to claim 4, wherein said thread sections are distributed in zigzag fashion.

6. The element according to claim 1, wherein said element comprises zones having a different number of thread sections per surface unit.

7. In an element having a plurality of opposite faces, and made of a reinforced low density ablative heat protective material including an elastomer and/or silicon resin matrix loaded with organic and/or inorganic components, the improvement wherein the reinforcement is formed of rectilinear sections of ceramic, glass or organic threads disposed in said matrix along directions approximately orthogonal to at least one of the opposite faces of the element, each thread section extending between two opposite faces and being flush at each of their extremities with one of said opposite faces, wherein one of the opposite faces is coated with a fabric or piece of silica or glass felt or organic material traversed by said thread sections.

* * * * *